(12) United States Patent
Lin

(10) Patent No.: US 11,176,710 B2
(45) Date of Patent: Nov. 16, 2021

(54) CAMERA SYSTEM FOR AN X-RAY COUNTER SYSTEM

(71) Applicant: SCIENTIFIC TECHNOLOGY ELECTRONICS PRODUCTS, INC., Chino, CA (US)

(72) Inventor: Eddy Yining Lin, Diamond Bar, CA (US)

(73) Assignee: SCIENTIFIC TECHNOLOGY ELECTRONICS PRODUCTS, Chino, CA (US)

(*) Notice: Subject to any disclaimer, the term of this patent is extended or adjusted under 35 U.S.C. 154(b) by 0 days.

(21) Appl. No.: 16/710,949

(22) Filed: Dec. 11, 2019

(65) Prior Publication Data
US 2021/0183107 A1    Jun. 17, 2021

(51) Int. Cl.
| H04N 7/18 | (2006.01) |
| H04N 9/47 | (2006.01) |
| G06T 7/00 | (2017.01) |
| H04N 5/225 | (2006.01) |
| H04N 5/247 | (2006.01) |
| G06Q 10/08 | (2012.01) |
| G01N 23/04 | (2018.01) |

(52) U.S. Cl.
CPC ............ *G06T 7/97* (2017.01); *G01N 23/04* (2013.01); *G06Q 10/087* (2013.01); *H04N 5/2253* (2013.01); *H04N 5/2256* (2013.01); *H04N 5/247* (2013.01); *G06T 2207/10116* (2013.01); *G06T 2207/30108* (2013.01); *G06T 2207/30242* (2013.01)

(58) Field of Classification Search
CPC .. H04N 7/18; H04N 9/47; H04N 5/30; H04N 5/335; H04N 5/2253; H04N 5/2256; H04N 5/247; G06T 7/97; G06T 2207/10116; G06T 2207/30108; G06T 2207/30247; G01N 23/04; G06Q 10/087
USPC .................................... 348/91, 162, E5.086
See application file for complete search history.

(56) References Cited

U.S. PATENT DOCUMENTS

| 8,824,634 B2 * | 9/2014 | Lalena ..................... A61B 6/08 378/97 |
| 8,961,011 B2 * | 2/2015 | Lalena .................. A61B 6/465 378/198 |

(Continued)

*Primary Examiner* — Trang U Tran
(74) *Attorney, Agent, or Firm* — Patzik, Frank & Samonty Ltd.

(57) ABSTRACT

A camera system for an X-ray counter system utilizing an X-ray generator to image components of products placed on a tray, the camera system comprising: a plurality of cameras positioned above the tray for imaging the products. The tray includes a plurality of stages positioned about a central crosshair. Upon imaging the products on the stages of the tray, the camera system determines the size and number of products on the tray without user imputation. A light source assembly provides illumination to ensure bright field of vision for the cameras to read codes contained on the products that relay information on the previous calculation of the number of components stored on the products. After the X-ray generator images the products, a computer system determines the current number of components stored on the products. New labels may be printed to reflect any changes in the information for the products.

9 Claims, 6 Drawing Sheets

(56) References Cited

U.S. PATENT DOCUMENTS 9,594,033 B2 * 3/2017 Georgeson .......... G01V 5/0016
10,575,805 B2 * 3/2020 Laukkanen .......... A61B 6/0414

* cited by examiner

CAMERA SYSTEM FOR AN X-RAY COUNTER SYSTEM

FIELD OF THE INVENTION

The invention relates generally to inventory management and, more particularly, to a system for efficiently sorting, identifying and updating information on goods in inventory.

BACKGROUND OF THE INVENTION

The manufacturing of products often requires components or parts to be stored for future use to expedite the timeline for manufacturing products when ordered. In order to efficiently operate the production line or output, it is important for manufacturers or finishers to keep track of the components it has in inventory. Insufficient product inventory can cause costly line shutdowns or interruptions in the production line.

One example of a product for which manufacturers often keep components on hand is electronic processors. As processors are made up of a number of individual components, with many of those components being relatively small such as resistors or transistors, it often is difficult to accurately know and control the current inventory quantities to effectively manage the storage costs and conditions.

The development of surface mount technology ("SMT") in the 1960's and its widespread adoption in the 1980s changed how electronic processors were made. SMT allowed components to be placed directly onto the surface of printed circuit boards. This allowed them to be significantly smaller, typically ¼ to ¹/₁₀ the size of through-hole or other components.

The adoption of SMT allowed a large number of components to be stored on strips in reels or on trays for production lines. In order to facilitate inventory management, barcodes, QR codes or other indicia are used to store information on the components stored therein. Previously, information stored on the codes typically would be retrieved by an employee using a handheld scanner. Any changes in the amounts or types of components stored in a particular reel would require the code to be updated. These systems and processes resulted in a very inefficient process that often yielded a number of errors in the inventory. As a result, manufacturers often did not have an accurate understanding of the present inventory of components.

Accordingly, it is an object of the present invention to effectively and efficiently track inventory of components in production lines.

Yet another object of the present invention is to reduce the influence of human participation to improve production efficiency.

Another object of the present invention is to provide high resolution real-time images of small to medium sized objects in a production environment.

These and other objects and features of the present invention will become apparent in view of the present specification, drawing and claims.

BRIEF SUMMARY OF THE INVENTION

The present invention is an improvement over the prior X-ray counter systems in how the number and sizes of the reels or other elements to be tested are determined by the system and how barcodes on the reels are read by the system. In particular, the present invention comprises a camera system having one or more cameras for reading barcodes or other indicia on reels for use in an X-ray counter system having a housing and computer system. The X-ray counter system produces images of reels or other items for storing multiple smaller components so that their contents may be determined and verified. The camera system also determines the size and number of reels to be analyzed based on their placement on the tray of the X-ray counter system.

Each of the reels includes a reel housing for storing a strip of components (e.g., SMT products) and a label having a barcode or QR code that operatively stores or provides a link to stored information on the components on the reel. The X-ray counter system includes an X-ray generator such as an X-ray tube located above a tray to scan the reels placed on the tray to depict the contents of the reels onto an image detector located underneath the tray.

The tray includes four circular stages for receiving the reels thereon. The stages are differentiated from the remainder of the tray through a variation in color (e.g., white versus black) or other distinguishing features and are spaced apart on the tray with indicia such as a crosshair in the center thereof. As components may be stored on reels of a variety of sizes (e.g., 7", 13" and 15"), the cameras and associated software may be used to detect the reels. Particularly, the computer system includes a data processing module to collect and/or process data scanned by the X-ray counter system or the cameras and a system control module to control the running process of the system.

The frame includes an upper frame attached to a lower frame and includes a plate having a larger central aperture and a plurality of smaller apertures positioned around the larger central aperture. The cameras are positioned so that they may capture images of the barcodes on the labels through the smaller apertures. The vertical distances between the lenses of the cameras and the detection plane of the image detector is preferably about 770 mm. Above the plate is the X-ray generator or tube that is positioned so that X-rays may pass through the larger central aperture and then the reels to produce an image on the image detector.

In operation, the X-ray counter system is turned on through activation of a main power switch and a key switch, while the computer is separately turned on. The software to operate the X-ray counter system and process the information is then initiated if it is not already on. An access door is opened by pulling on the handle to provide access to the X-ray counter system and, particularly, the tray. Selected reels having strips of components are then placed within the housing on the stages of the tray. After closing the access door, the X-ray counter system is actuated.

The camera and computer systems will then determine the number and sizes of the reels bring analyzed by detecting what portions of the stages and indicia are covered by the reels. Particularly, smaller reels may be placed over the particular stages so that they do not interfere with the viewing of the indicia located between the stages. The camera system will capture the image and determine how many, and which of, the stages are covered to determine the number and location of the small reels to be analyzed. As a larger reel will extend over the boundaries of the stages and cover the indicia, the camera system will detect that a larger reel is being examined.

The light sources illuminate the reels and the labels thereon to facilitate the reading of the barcodes thereon by the cameras. The computer system then obtains the information stored on or associated with the barcodes concerning the reels' contents. The X-ray generator, after warming up, then emits X-rays through the central larger aperture to pass through the reels on the trays to provide an image of the reels' contents on the image detector. The image of the reels' contents is then transmitted to and processed by the computer system and displayed on the monitor. If the component information is different than the information stored on or associated with the barcode, the information is updated and a new label and barcode may be printed by a label printer operatively attached to the computer system and placed on the reels. Once the analysis of the reels is complete, additional reels may be analyzed or the system may be shut down.

Additional aspects and advantages of the invention are further described below, parts of which will become apparent from the descriptions below or be learned from the practice of the invention.

BRIEF DESCRIPTION OF THE DRAWINGS

The above and/or additional aspects and advantages of the invention shall be obvious and easily understood from the following descriptions of the embodiments in combination with the appended drawings, where.

Figure 1:
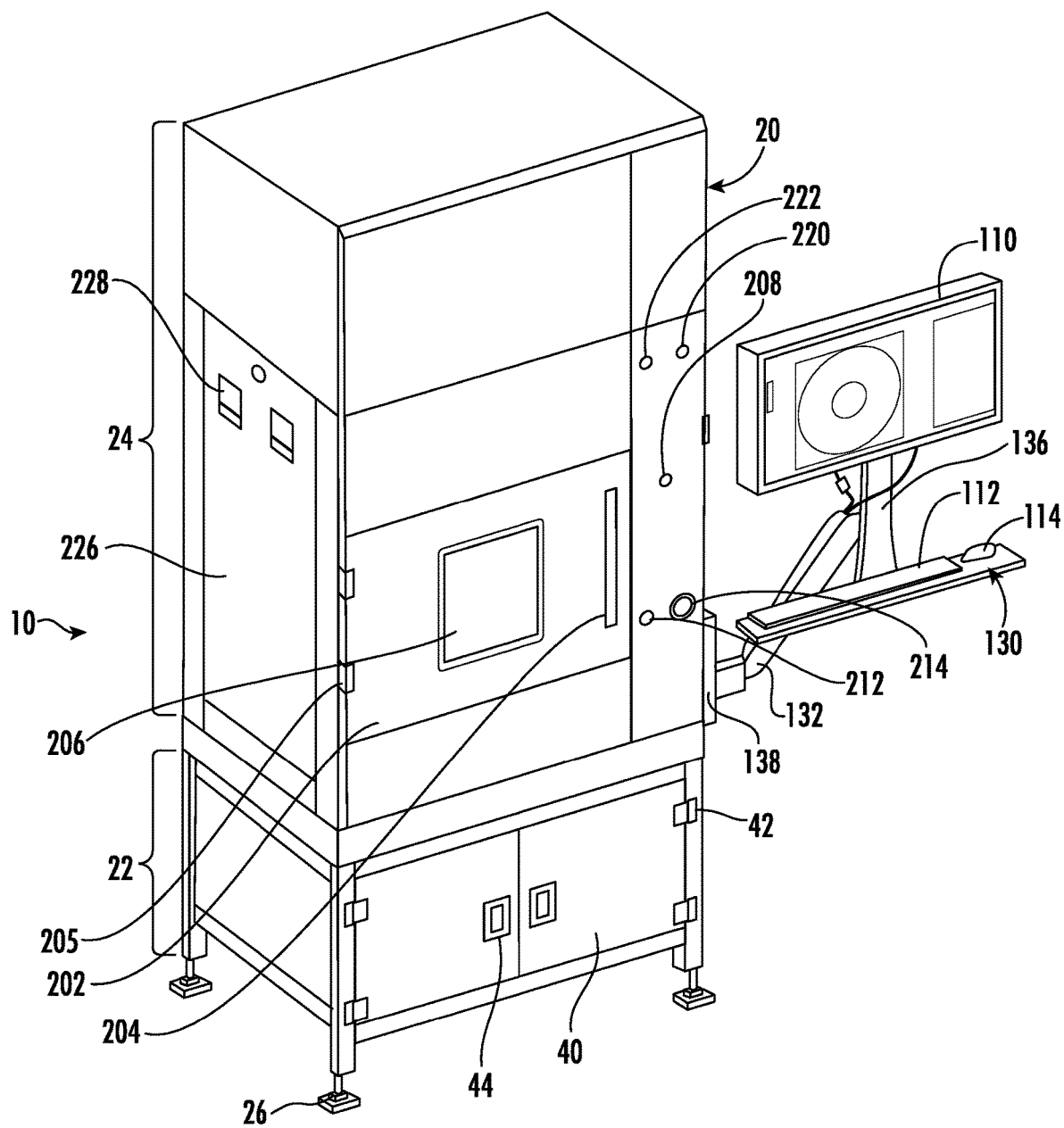
FIG. 1 is a front perspective view of the overall structure and housing of an X-ray counter system.

The preceding description and drawings merely explain the invention and the invention is not limited thereto, as those of ordinary skill in the art who have the present disclosure before them will be able to make changes and variations thereto without departing from the scope of the present invention.

DETAILED DESCRIPTION OF THE INVENTION

While the present invention is susceptible of embodiment in many different forms, there is shown in the drawings and will herein be described in detail one specific embodiment, with the understanding that the present disclosure is intended as an exemplification of the principles of the present invention and is not intended to limit the invention to the embodiment disclosed.

FIG. 1 shows one embodiment of a prior art X-ray counter system 10 generally comprising a housing 20 and a computer system 100. The housing extends, has a generally rectangular cross-sectional shape and comprises a lower computer storage section 22 and an upper imaging system section 24. Four legs or feet 26 may be attached or extend from about the corners of the bottom of the housing 20 and may be adjustable to elevate the imaging system section 24 to a desired height above the ground.

Figure 2:
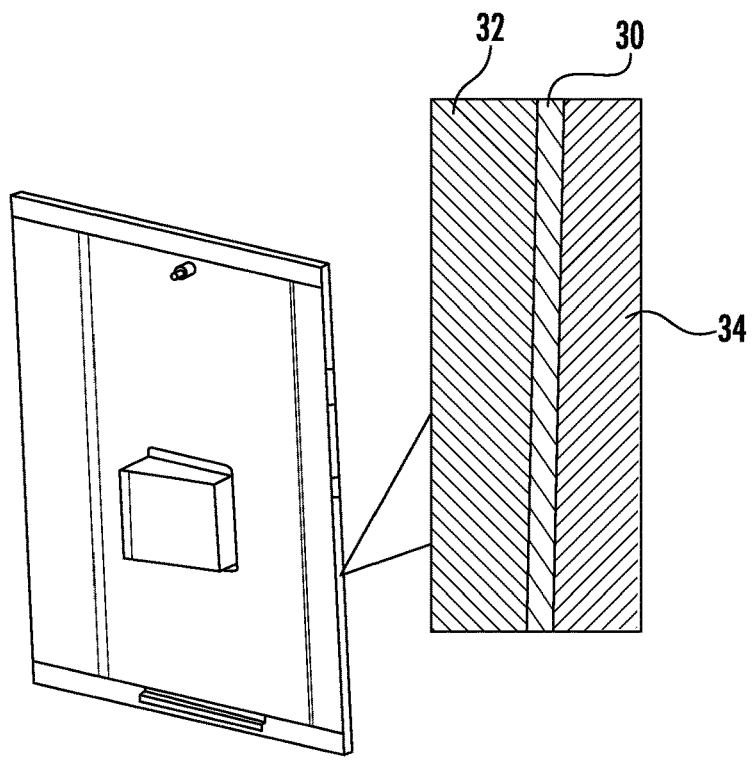
FIG. 2 is a partial cross sectional view of a portion of the wall of the housing showing its layers for the system shown in FIG. 1.

The housing 20 uses a primary radiation barrier and other shielding material to protect operators from the radiation beam and associated radiation. Referring to FIG. 2, one embodiment of the barrier comprises a lead plate 30 sandwiched between an inner steel plate 32 and an outer steel plate 34. Other known shielding material may be used and not depart from the present invention, provided it is preferred that the barrier be compliant with applicable DHHS Standards (e.g., 21 CFR Section 1020.40 Subchapter J). If used in occupied areas, the shielding material may be designed to reduce any radiation leakage to less than 0.5 mils roentgen in one hour at a point 5 centimeters from the external housing surface to allow the system to be used without any additional protection required.

The lower computer storage section 22 includes a pair of doors 40 that are rotatably connected to the housing about hinges 42 to permit the doors 40 to swing open to access the interior of the section 22. A pair of handles 44 may be located on the doors 40 to facilitate their opening.

Figure 3:
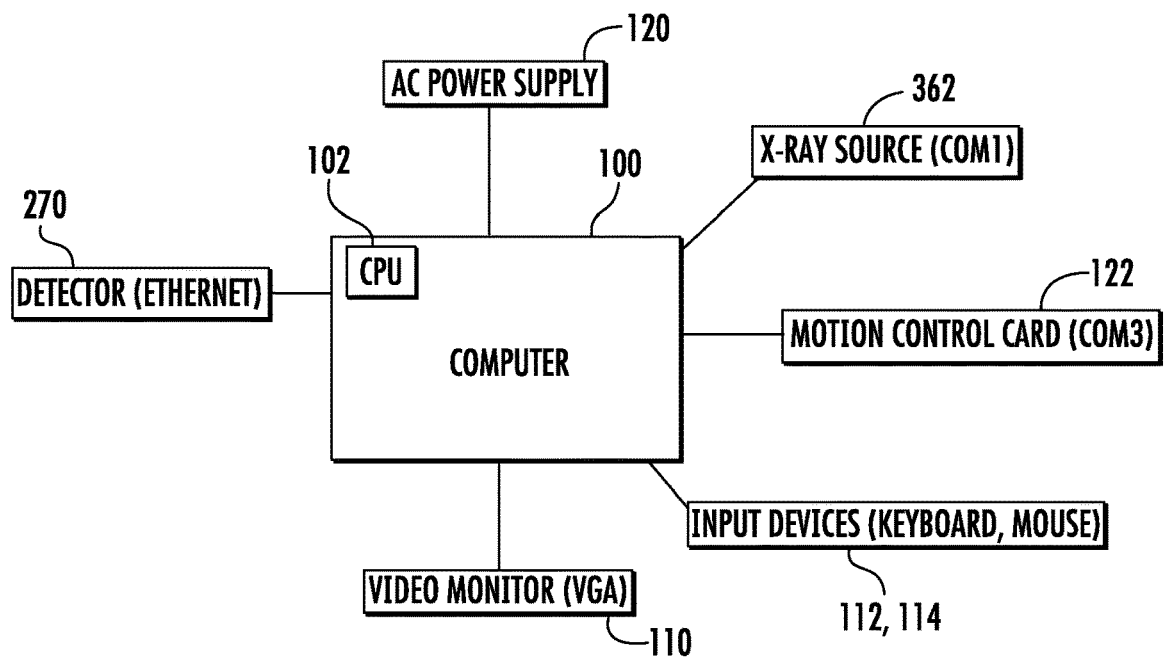
FIG. 3 is a diagram showing one embodiment of a computer system for an X-ray counter system.

It is appreciated that the computer system may comprise any computer having the known components necessary for use in an X-ray counter system. The computer system 100 includes a central processing unit 102, a display screen or monitor 110 and one or more input devices 112, 114. Input devices may include one or more keyboards 112 and/or mice 114 for user imputation. Referring to FIG. 1, the monitor and input devices may be positioned on a platform 130 that is connected to housing 20 through arm 132. Platform 130 may include a lower level 134 for locating the keyboard 112 and mouse 114, and a neck 136 extending upward therefrom to attach the monitor 110 through brackets or other known means. The housing wall mount 138 for which the arm 132 is connected to preferably includes a sealed opening for passing the connector cables (and other wires and cables) for the monitor 110 and input devices 112,114. As shown in FIG. 3, the central processor may also be connected to a power source 120, the image detector 270 and a motion control card 122.

Figure 4:
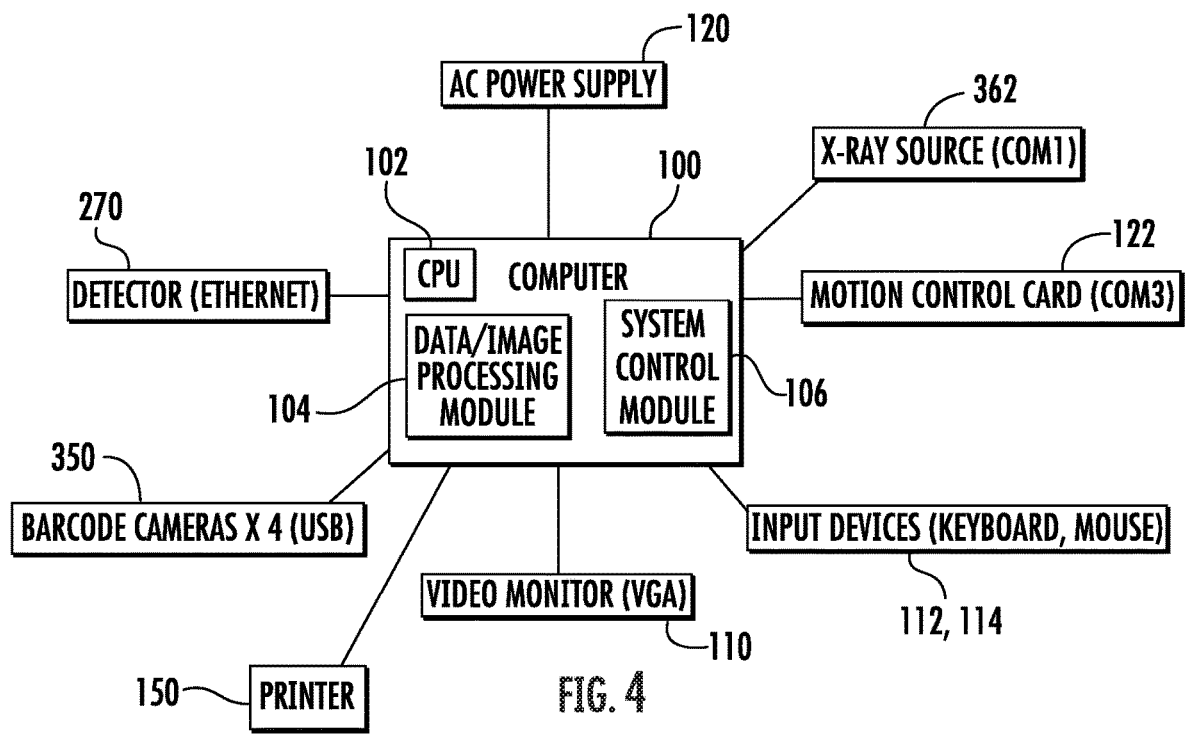
FIG. 4 is a diagram showing one embodiment of a computer system for the present invention.

FIG. 4 shows one embodiment of the computer system of the present invention including or being operatively connected to a data processing module 104 to collect and/or process the data scanned by the X-ray generator 362 and captured by the cameras 350, and a system control module 106 to control the running process of the X-ray counter system 10. The computer system may also have a printer 150 designed to print new labels or codes 298 (e.g., QR codes or barcodes) to update the number of products 296 stored on the reel 290.

While the X-ray counter system is shown and disclosed as being a stand-alone system, it is appreciated that the computer system may be networked with other computer systems and servers and not depart from the scope of the present invention.

The imaging system 200 is located within the upper portion of the housing 20. An access door 202 having a handle 204 is positioned in the middle of the housing 20 and rotatably connected thereto by hinges 205 to provide selective access to the imaging system 200. The door 202 may include a window 206 made of radiation shielding material such as, but not limited to, leaded glass to permit the interior of the housing 20 to be viewed during operation. Proximate the door 202 is a sensor (not shown) that detects when the door 202 is opened to shut down power to the imaging system 200 to inhibit radiation exposure during an accidental opening when the system is in use.

A main switch 208 is located on the front of the housing 20 to turn on the X-ray counter system 10. The exterior of the housing 20 also includes a key switch 212 that limits power to the entire system except for the computer system 100 until the key is inserted and the switch 212 is actuated. An emergency stop button 214 may be used in connection with the key switch 212 to provide a means to quickly shut down operation of the imaging system 200, particularly the X-ray generator 362, if desired. In order to avoid potential data loss, it is preferred that the computer system 100 be powered separately from the imaging system 200 so it is not shut down by operation of the emergency stop button 214.

The imaging system 200 may also include a number of other indicators to provide notice as to the status and operation of the system. For example, a light 220 may be utilized to indicate when the power is on and the system is in a ready state and in standby mode. Another light 222 may be used to indicate when the X-ray generator 362 is being operated to provide a warning about potential radiation. In operation, the X-ray on light 222 may illuminate so that it is readily visible to indicate that the X-ray generator 362 is in use (e.g., red). A main switch 224 may be present to turn on the system, thereby illuminating the power-on light 200.

Additional electronic equipment such as a high voltage power supply 120, a motor driver, a motion control card 122 and other circuitry may be separately housed within the housing 20 and accessed by a door or panel in the housing 20. For protection of operating personnel, it is appreciated that the X-ray power supply of the system be grounded. In one embodiment, three conductor AC power cables (not shown) may be used such that when connected, they ground the X-ray system through the offset pin.

The housing 20 may also include left and right access doors 226 on each side to provide access to the imaging system 200 for inspection and maintenance. A pair of interlock switches (not shown) on the access door 202 may be concatenated with safety locks (not shown) on the left and right access doors 226 or walls of the housing 20 to help prevent accidental opening of any of the doors 202, 226 during operation of the imaging system 200.

Figure 5:
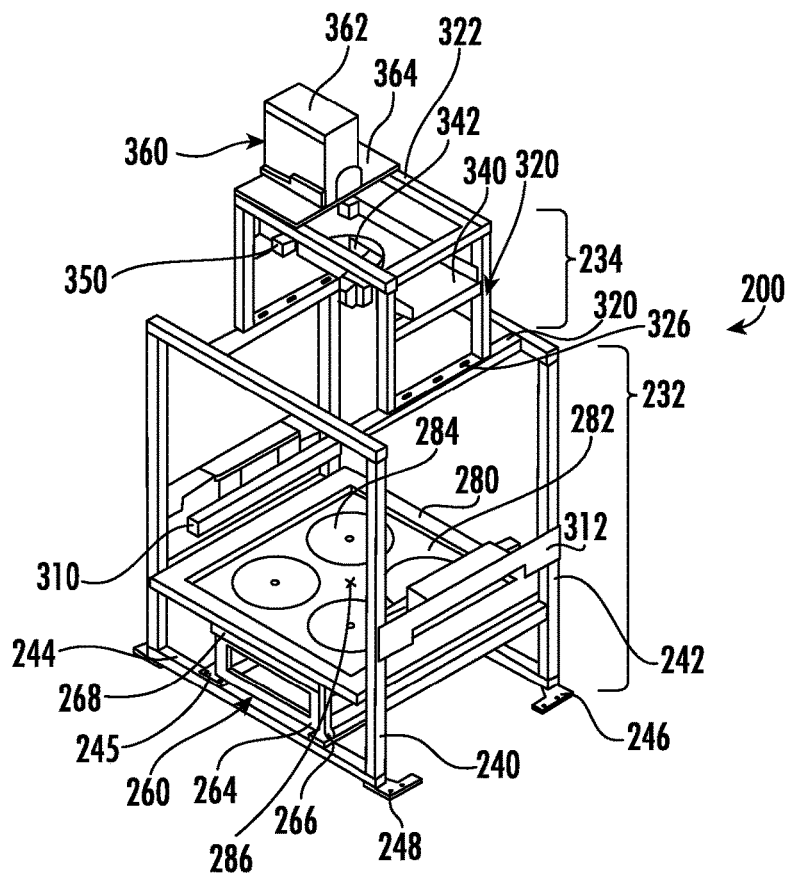
FIG. 5 is front perspective view of the camera system of the present invention installed on a frame of an X-ray counter system.
Figure 6:
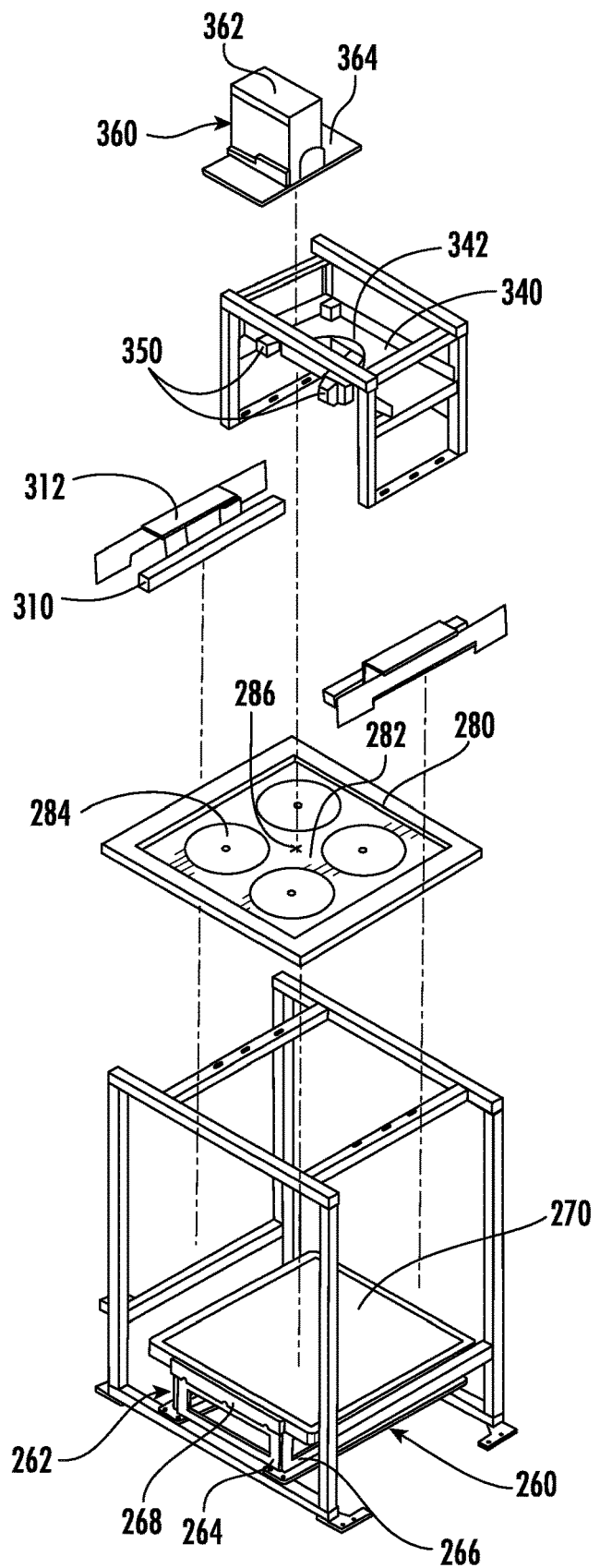
FIG. 6 is a partial exploded perspective view of the system shown in FIG. 5.

The imaging system 200 may be mounted within a frame 230 consisting of a lower frame member 232 and an upper frame member 234. It is also appreciated that the components of the imaging system may be attached directly to the interior of the housing without a frame if desired. Referring to FIG. 5, the lower frame member 232 consists of side rectangular members 240 comprising a pair of vertical members 242 and a pair of horizontal members 244 that are welded together. Feet or other attachment members 246 may be connected to the bottom horizontal members 244 to attach the frame 230 to the interior compartment of the housing 20. While the feet 246 are shown as including a pair of holes 248 for receiving screws or bolts to fix the frame member in place, it is appreciated that other attachment members may be used.

Attached to the bottom horizontal members 244 using screws, rivets or other known means 245 is a flat plate assembly 260 comprising a base portion 262 comprising two end wall members 264 and two side wall members 266 that are connected together to form a rectangular base. Extending from or connected to the top of the end wall members 264 are retaining members 268 that are used to retain and fasten an image detector 270 therewithin. An example of a suitable image detector is a TFT style X-ray detector with a 17"×17" sensor area.

Figure 7:
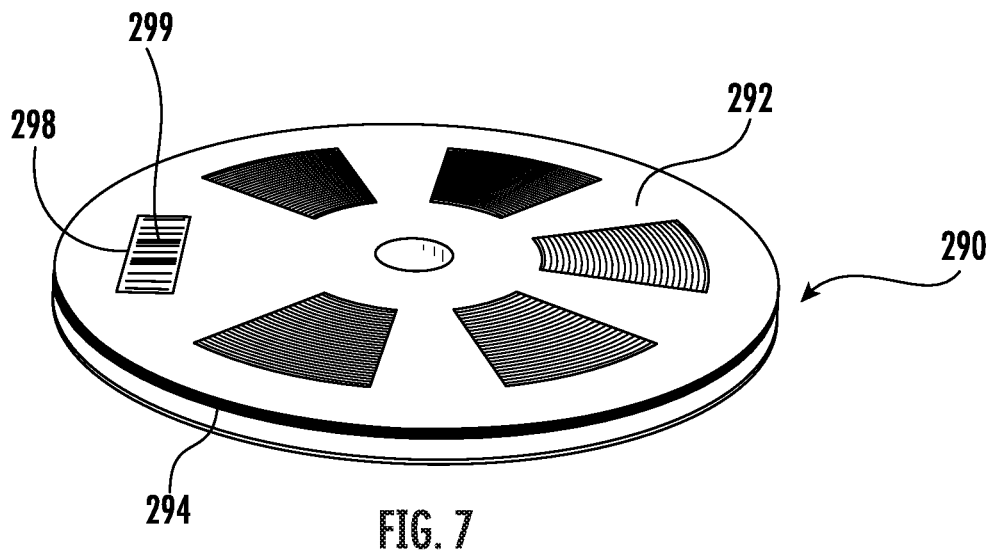
FIG. 7 is a perspective view of a reel.

A tray 280 is positioned above the image detector 270 for receiving one or more reels 290. While reels for SMT products are shown and disclosed, it is appreciated that the present invention may be applied to a wide variety of fields utilizing small to medium parts including, but not limited to: electronic and electric appliances; automotive; chemical products; aviation; pharmaceuticals; sporting goods and equipment; and metal products such as aluminum cans. For example, it is appreciated that the system may be used in connection with other small to medium components or parts, or other applications, including, but not limited to: tubes; JEDEC trays; BGA ball counts; loose wound components; cut strips; copper splice removal; sealed ESD bags; tightly wound components; or penetrable desiccants. Referring to FIG. 7, each of the reels 290 include a reel housing 292 for storing a strip 294 comprising one or more components 296. A label 298 including a QR code or barcode 299 is located on the top of the reel housing 290 to store or provide a link to stored information on the reel's components 296.

A pair of cross bars 300 may extend between the frame members 240 to permit the tray 280 to be positioned on top of or otherwise connected to the lower frame 232. A recessed central area 282 in the tray 280 is designed with a numbers of stages 284 for positioning one or more reels 290 or other units to be counted. The stages are equally spaced about the center of the tray, which includes a crosshair 286 or other indicia thereon. The stages are areas on the tray that are differentiated from the remainder of the tray. In one embodiment, the stages may be circular areas having a different coloration compared to that of the tray. While the stages are shown and disclosed as being circular, it is appreciated that they may be a variety of shapes and not depart from the scope of the present invention. Referring to FIG. 5, four stages 284 are shown as being sized for receiving four 7" reels, although other numbers or sizes of reels may be used. For example, a larger reel such as a 13" or 15" reel may be placed over the stages.

A light source assembly comprises two opposing light sources 310 positioned over the sides above the tray 280 to illuminate the reels 290 and barcodes 299 during use. The lights sources are shown as elongated LED light bars but may be a variety of other known lights. Brackets 312 may be used to connect the light bars 310 to the frame members 240 or interior of the housing 20 using screws or other known connecting means.

A pair of cross bars 320 extend across the top of the lower frame 232 to provide a base for attaching the upper frame 234 thereto. The upper frame 234 includes a tubular frame consisting of two side members 320 each comprising a pair of vertical members 322 and a lower connecting member 324 connected together by welds or other attachment means. The lower connecting members 324 include a plurality of holes 326 extending therethrough to permit the upper frame 234 to be connected to the lower frame 232 using screws, bolts or rivets. It is appreciated that the cross bars 320 of the lower frame member 232 may include a plurality of corresponding holes to allow the upper frame 234 to be attached thereto. A top frame member 330 includes two side members 332 connected to two end members 334 to form a rectangular frame that is attached atop the four vertical tubes of the two side members 320.

Cross bars 336 extend between the vertical members 322 of each of the side members 320 to provide a frame for supporting and attaching a plate 340 through screws or other connecting means. The plate 340 includes a central larger aperture 342 and a plurality of spaced apart smaller apertures 344. One or more cameras 350 are positioned above the smaller apertures 344 such that the cameras' lenses may capture images of the barcodes 299 used on the reels 290 or other units. The cameras may also be attached to the sides of the plate or to the upper frame itself. The cameras are preferably digital or charge coupled devices. While FIG. 5 shows four cameras arranged in a rectangular configuration about the central larger aperture, it is appreciated that different numbers of cameras may be used depending on their resolution and output so long as they are able to adequately identify and read the barcodes or QR codes on the units to be analyzed. In one embodiment, the vertical distance between the lenses of the cameras and the detection plane is about 770 mm and the camera resolution is about 14 million pixels.

Light tube assembly 360 includes an X-ray generator 362 such as a micro focus X-ray tube that is positioned and secured on plate 364 such that it emits X-rays through the central larger aperture 342 to scan the reels 290 or other work pieces placed on the tray 280. The plate 364 is attached proximate its ends to the top frame member 330 through welds, screws or other attachment means. While the central larger aperture 342 is shown as circular, it is appreciated that it may be of any shape and size that is sufficient for the X-rays to pass through for scanning the items 290 on the tray 280.

Figure 9:
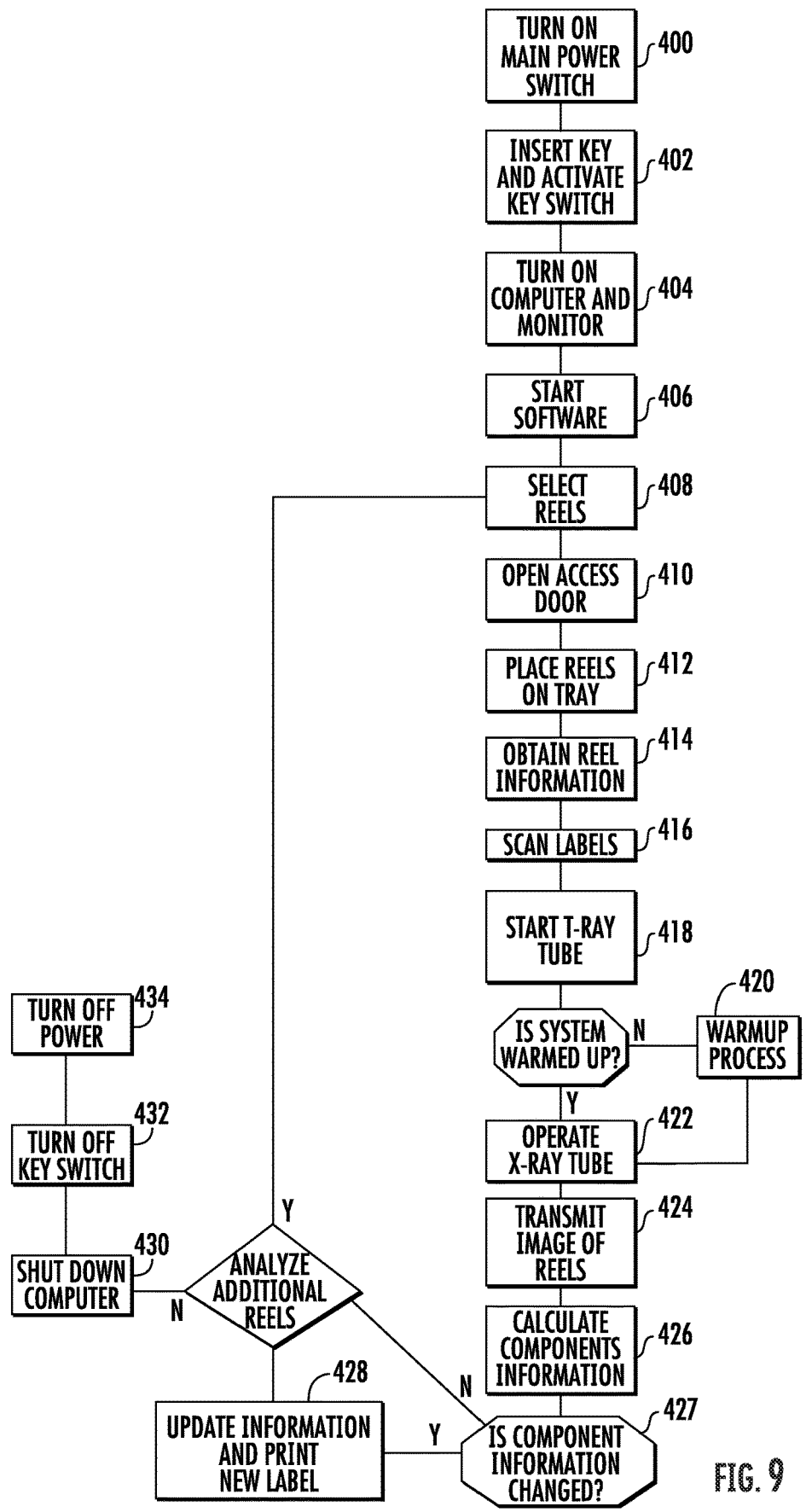
FIG. 9 is a flow chart illustrating the steps in one embodiment of the method of using the camera system the present invention in an X-ray counter system.

Referring to FIG. 9, a flowchart illustrating one embodiment of the steps involved in operating the X-ray counter system using the camera system of the present invention is shown. The application of power is done by switching the main power switch 208 on in step 400 and inserting a key into key switch 212 and rotating the key switch 212 to the on position 402. Monitor 110 and the computer system 100 are then turned on at step 404 when they have a different power source than the imaging system 200. If the software including the data processing module 104 and the system control module 106 for the computer system 100 are not operating or self-initiating when the computer system 100 is turned on, the software should be opened at step 406.

One or more reels 290 are selected for analysis and then placed on or over the stages 284 of the tray 280 with the codes 299 of the labels 298 positioned on the upper surface after opening the access door 202 at steps 408,410,412. If smaller reels 290 are to be analyzed, they are placed over the individual stages 284, wherein a larger reel 290 is placed in the central region of the tray over the crosshair 286 and parts of the stages 284. Once the reels 290 are placed therein, the access door 202 may be closed and locked. In step 414, the cameras 350 take an image of the reels 290 on top of the stages 284 of the tray 280. A reel subroutine is executed to determine how much of the stages and crosshair are covered by the reels to determine the number and sized of the reels to be analyzed. For example, if the crosshair and portions of the stages are covered, the system will recognize that the tray contains a larger reel for examination. If the crosshair is uncovered, the system will determine which of the stages are covered by small reels and keep track of their location for further processing. The labels 298 on the reel housing 292 are scanned by cameras 350 at step 416 to read the barcodes 299 contained therein to receive information on the number and types of components 296 stored on the reels 290. This information is then stored on the computer system and associated with the particular reels based on their location on the tray.

Keyboard 112 and/or mouse 114 may then be used to start the X-ray generator 362 in step 418. It is also appreciated that the system may automatically start after reels are placed on the tray and the access door is closed. If the X-ray generator 362 has not been used that day, a warmup process of about 15 minutes at step 420 will start before operation of the X-ray generator 362 to extend the life of the X-ray generator 362. If the X-ray generator 362 has not been used for more than 24 hours, a longer warm-up such as 30 minutes is preferred. Once the system is warmed up, the power on light 220 will turn green. The X-ray generator 362 will then operate to use electromagnetic radiation to pass through the reels 292 to produce an image 370 on the detector 270 at step 422. After the X-ray generator 362 is turned on, the X-ray on light 222 turns from green to red to provide a visible warning of the use of radiation.

Figure 8:
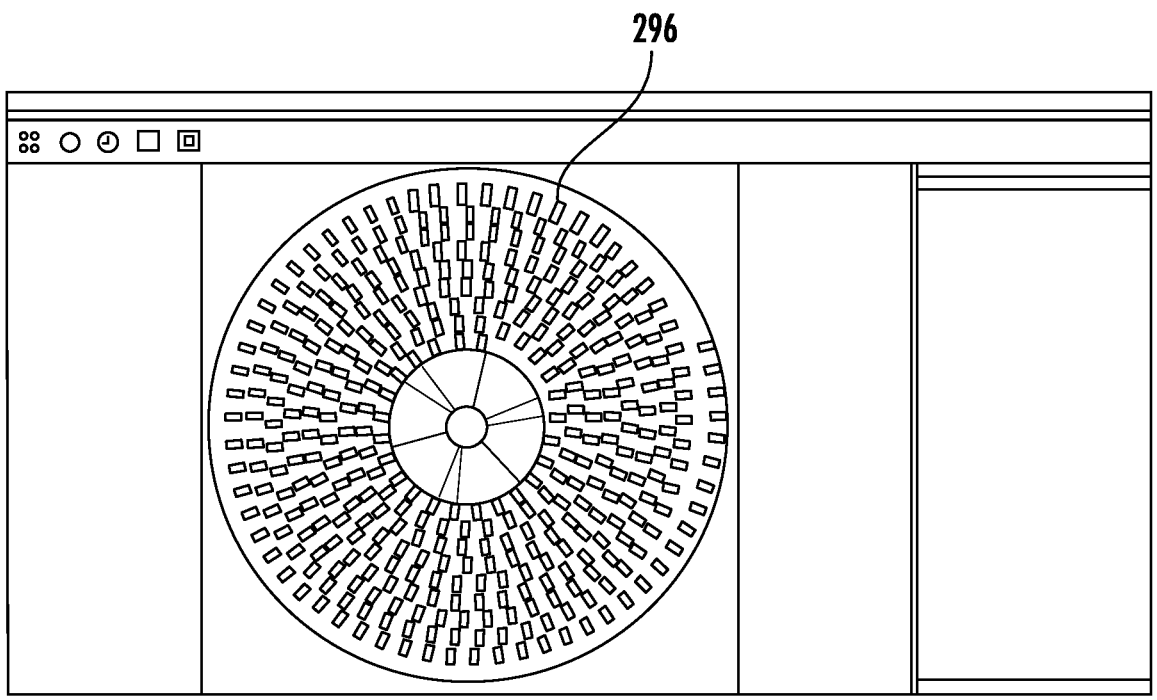
FIG. 8 is a top plan view of an exemplary image of a screenshot of a reel produced by the X-ray counter system.

FIG. 8 shows one example of an image 370 created by the X-ray counter system of a reel 290 showing the number and location of the components 296 stored therein. The image 370 is then transmitted at step 424 from the detector 270 to the computer system 100 so that the image may be stored therein and viewed on the monitor 110. The information on the components 296 is calculated and stored on the computer system 100 at step 426 for future reference. In step 427, the central processing unit 102 compares the previous information of the components 296 stored in the reels 290 obtained from the barcodes 299 to the current information obtained from the image from step 426. If the information on the components 296 is different from what was previously stored on the barcodes 299, the information is updated and new labels 298 and barcodes 299 may be printed using label printer 150 and placed on the reels 290 at step 428. In one embodiment, the computer system determines which reel has been removed and then prints the associated label and barcode for applying to the reel housing.

If additional reels are to be analyzed, the new reels may be placed within the housing and the process may be repeated. Otherwise, the computer system 100 may be shut down after closing the software at step 430. Thereafter, the key switch 212 may be turned to the off position and the key removed at step 432. Finally, main power switch 208 may be turned off at step 434.

The preceding description and drawings merely explain the invention and the invention is not limited thereto, as those of ordinary skill in the art who have the present disclosure before them will be able to make changes and variations thereto without departing from the scope of the present invention.

The invention claimed is:

1. A method of determining the number of components stored on one or more products using an X-ray counter system comprising a computer system having a central processing unit and a data processing module, a tray for receiving at least one product storing components therein, an X-ray generator, a camera system having one or more cameras positioned above the tray, and an image detector for obtaining a first image of the components of the at least one product, each of the at least one product having a label with a code thereon, the tray having a central area, the method comprising the steps of:

allowing the at least one product to be placed onto the tray;

creating one or more second images of the location and placement of the at least one product on the tray with the one or more cameras;

creating one or more third images of the code of each of the at least one product using the one or more cameras; and operating the data processing module, the data processing module comprising the steps of:

determining the number and size of at least one product to be tested based on the one or more second images;

determining the prior number of components on the at least one product from the imaged codes of the one or more third images;

receiving the first image and determining the number of components currently stored on the at least one product;

comparing the information on the prior number of components on the at least one product to the number of components currently stored on the at least one product; and updating the code on each of the at least one product to reflect the number of components currently stored on the at least one product if the information on the prior number of components on the at least one product differs from the number of components currently stored on the at least one product.

2. The method of claim 1 wherein the data processing module further comprising the steps of determining which of the at least one product is being removed from the X-ray counter system and printing a new label with a new code to reflect the number of components currently stored on the at least one product being removed.

3. The method of claim 1 wherein the one or more cameras are about 770 millimeters above the tray.

4. The method of claim 1 which further comprises the step of illuminating the at least one product on the tray.

5. The method of claim 1 wherein the x-ray counter system comprises a plate having a central aperture and at least one smaller aperture located about the central aperture, the central aperture being aligned with the X-ray generator to permit X-rays to pass therethrough to image the at least one product, and the at least one smaller aperture being aligned with the one or more cameras to allow the one or more cameras to view and image the at least one product and tray.

6. The method of claim 1 wherein the one or more cameras comprises four cameras.

7. The method of claim 1 where the tray includes indicia in the central area of the tray and a plurality of stages spaced apart on the try around the indicia.

8. The method of claim 7 wherein the indicia is a crosshair.

9. The method of claim 1 wherein the at least one product are reels with the components stored on strips on the reels.

\* \* \* \* \*